United States Patent

[11] 3,577,003

| [72] | Inventors | Byron C. Behr<br>Norwalk, Conn.;<br>Gunars Sprogis, Cleveland, Ohio;<br>Frederick E. Booth, Weston, Conn. |
|---|---|---|
| [21] | Appl. No. | 806,215 |
| [22] | Filed | Mar. 11, 1969 |
| [45] | Patented | May 4, 1971 |
| [73] | Assignee | Union Carbide Corporation<br>New York, N.Y. |

[54] AUTOMATIC BATTERY SWITCHING DEVICE
3 Claims, 1 Drawing Fig.

| [52] | U.S. Cl. | 307/66 |
|---|---|---|
| [51] | Int. Cl. | H02j 7/00 |
| [50] | Field of Search | 307/66;<br>320/15, 30 |

[56] References Cited
UNITED STATES PATENTS

| 3,483,393 | 12/1969 | Gutzmer et al. | 307/66 |
| 3,300,651 | 1/1967 | Larsen | 307/66 |
| 2,992,363 | 7/1961 | Granquist | 307/66UX |
| 2,729,750 | 1/1956 | Draper et al. | 307/66X |

Primary Examiner—Robert K. Schaefer
Assistant Examiner—H. J. Hohauser
Attorneys—Paul A. Rose and Robert C. Cummings ABSTRACT: An apparatus for automatically switching off a working battery and switching on a standby battery when the working battery falls below a predetermined working voltage. The device utilizes at least one switching element such as a transistor associated with the working battery and at least one switching element such as a transistor associated with the standby battery, with the transistor associated with the working battery being connected so as to back bias the transistor associated with the standby battery. When the working battery wears down to a predetermined voltage its back bias is reduced to a sufficient point so as to turn on the standby transistor and thereby switch on the standby battery.

PATENTED MAY 4 1971
3,577,003
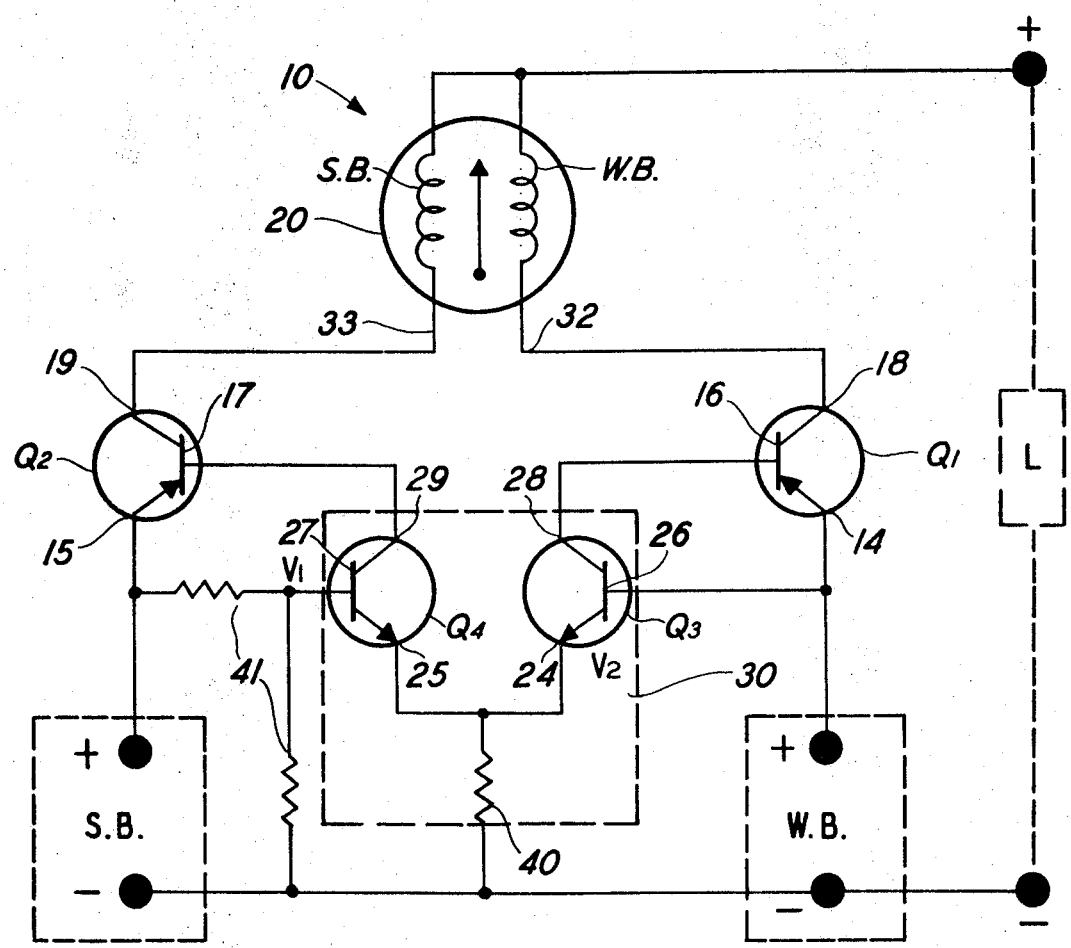
INVENTORS
BYRON C. BEHR
GUNARS SPROGIS
BY FREDERICK E. BOOTH, JR
ATTORNEY

AUTOMATIC BATTERY SWITCHING DEVICE

This invention relates to switching devices and more particularly to a device for automatically switching off a working battery and switching on a standby battery when the working battery falls below a predetermined working voltage.

While not limited thereto, the invention is particularly useful in conjunction with air cell batteries which are utilized in large quantity for railroad and emergency lighting applications. In both of these areas of use it is common practice to make periodic inspections to check battery wear by measuring the specific gravity of its electrolyte. While this can be done visually in a crude but sometimes adequate manner with many emergency lighting batteries, a hydrometer test of the specific gravity of the battery electrolyte is the more accurate test of battery wear and is usually required by the railroad industry. This is an extremely time-consuming but presently necessary overhead expense. Moreover, the intervals between inspections to determine battery wear must be short in order to avoid complete malfunction of the appliance being operated by the battery, i.e. it is important that battery replacement is made prior to its falling below its useful voltage level.

It is an object of the present invention to provide a device for use with a working battery and a standby battery wherein the working battery is automatically switched off and the standby battery is automatically switched on in response to the working battery falling below a predetermined working voltage.

Another object of the invention is to provide an automatic battery-switching device which includes an indicator means for visually determining whether the working battery or the standby battery is providing power to the load.

Yet another object is to provide an automatic battery-switching device which is low in cost, noncomplex in operation, requires little or no maintenance and requires very low power to operate as compared with conventional electrical relays.

According to the invention, an automatic switching device is provided for connection to a working battery and a standby battery. The device includes a first switching means such as a transistor which is adapted to be electrically connected in series between the working battery and the load, the same being normally closed or "on." A second switching means such as a transistor which is adapted to be electrically connected in series between the standby battery and the load is also included, the same being normally open or "off." In addition, the device includes control means responsive to the voltage across the working battery for opening the first switching means and closing the second switching means.

The sole drawing is a circuit diagram of the switching device of the invention.

Referring to the drawing, the switching device 10 of the invention is provided for connection to a working battery WB and a standby battery SB. The device includes a first transistor switching means Q1 having an emitter 14, a base 16 and a collector 18, and a second transistor switching means Q2, having an emitter 15, a base 17 and a collector 19. The first transistor Q1 and second transistor Q2 are connected in series between the working battery and standby battery respectively and the load L, with the collectors 18 and 19 respectively being connected in series with an electrical current indicator 20. The device further includes control means 30 responsive to the voltage of the working battery such that when the same falls below a predetermined value, the second transistor Q2, which is normally open, i.e. "cut off," is closed, i.e. driven into saturation, while first transistor Q1, which is normally closed, i.e. in saturation, is opened, i.e. "cut off," thereby switching on the standby battery and switching off the working battery.

The control means preferably comprises a third transistor Q3 having its base 26 connected to emitter 14 of first transistor Q1 and having its collector 28 connected to the base 16 thereof, and a fourth transistor Q4 having its base 27 connected to emitter 15 of second transistor Q2 and having its collector 29 connected to the base 17 thereof. Third and fourth transistors Q3 and Q4 respectively have their emitters 24 and 25 respectively connected together through a common resistor 40 to one terminal of the standby and working batteries.

Preferably a voltage divider network 41 is incorporated between transistor Q4 and the standby battery in order to selectively bias the base 27 thereof, and thereby prevent current from flowing from the standby battery to the load while the working battery is in operation.

In operation, working battery WB is essentially connected across the load since transistor Q1 is in saturation. During the period of time in which the working battery provides current to the load, transistor Q2 is cut off. The voltage V2 across resistance 40 at this time is greater than voltage V1 established by the voltage divider network 41 thereby rendering transistor Q4 inoperative or reverse biased. However, upon the working battery voltage declining to a predetermined level, voltage V2 across resistance 40 becomes less than voltage V1 to cause the operating modes of transistors Q4 and Q3 to reverse states. The transistor Q4 switches from its normally reversed biased state to a forward biased state which in turn reverses biased transistor Q3. Current may now flow from the positive terminal of the standby battery SB through the emitter 15 to base junction 17 of transistor Q2, through the collector 29 to emitter 25 of transistor Q4, through resistor 40 and back to the negative terminal of the standby battery; the current being of sufficient magnitude to saturate transistor Q2. At this point the standby battery SB is essentially connected across the load while the working battery WB is rendered inoperative since transistor Q3 which is now reversed biased prevents current flow through transistor Q1 causing transistor Q1 to become cut off.

Meter 20 is responsive to current flow in either leg 32 or 33 depending upon which battery is supplying the load. Thus, when an inspector sees the indicator pointing to standby battery operation, he knows it is time to replace the working battery with a new one.

While the invention has been described in conjunction with the specific circuitry shown in the drawing, it is obvious that certain modifications may be made to the invention and that some parts may be used without others, all within the spirit and scope of the invention as defined by the appended claims. For example, while it is preferable to utilize a voltage-divider network as described hereinbefore, the same may be omitted from the circuit if the transistors associated with the working battery have different characteristics than the transistors associated with the standby battery, e.g. germanium transistors could be associated with the working battery while silicon transistors could be associated with the standby battery since their voltage level requirements are different.

I claim:

1. A switching device for automatically transferring power supplied to a load from a working battery to a standby battery comprising:
    a. a first transistor switching means adapted to be electrically connected in series between the working battery and the load, the same being normally on;
    b. a second transistor switching means adapted to be electrically connected in series between the standby battery and the load, the same being normally off; and
    c. transistor control means responsive to the voltage across the working battery for opening said first transistor switching means and closing said second transistor switching means when the voltage across the working battery drops below a predetermined level, said control means comprising a third transistor having its base connected to the emitter of the first transistor and having its collector connected to the base of the first transistor; a fourth transistor having its base connected to the emitter of the second transistor and having its collector connected to the base of the second transistor, and said third and fourth transistor having their emitters connected together through a common resistor to one terminal of said batteries.

2. A switching device as in claim 1, further including a voltage-divider network connected between the standby battery and the fourth battery.

3. A switching device as in claim 1, further including an electrical indicator means connected between the load and said first and second transistors for indicating whether the working battery or the standby battery is delivering power to the load.